US012647951B2

(12) United States Patent
Bhamri et al.

(10) Patent No.: US 12,647,951 B2
(45) Date of Patent: Jun. 2, 2026

(54) TIME-DOMAIN REPETITION OF A SET OF TRANSPORT BLOCKS

(71) Applicant: Lenovo (Singapore) Pte. Ltd., New Tech Park (SG)

(72) Inventors: Ankit Bhamri, Rödermark (DE); Hyejung Jung, Northbrook, IL (US); Alexander Johann Maria Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 547 days.

(21) Appl. No.: 18/008,414

(22) PCT Filed: Jun. 4, 2021

(86) PCT No.: PCT/IB2021/054926
§ 371 (c)(1),
(2) Date: Dec. 5, 2022

(87) PCT Pub. No.: WO2021/245624
PCT Pub. Date: Dec. 9, 2021

(65) Prior Publication Data
US 2023/0232380 A1 Jul. 20, 2023

Related U.S. Application Data

(60) Provisional application No. 63/034,881, filed on Jun. 4, 2020.

(51) Int. Cl.
*H04W 72/0446* (2023.01)
*H04W 72/1263* (2023.01)
*H04W 72/23* (2023.01)

(52) U.S. Cl.
CPC ... *H04W 72/0446* (2013.01); *H04W 72/1263* (2013.01); *H04W 72/23* (2023.01)

(58) Field of Classification Search
CPC ......... H04W 72/0446; H04W 72/1263; H04W 72/23; H04W 16/14; H04L 1/08
See application file for complete search history.

(56) References Cited

U.S. PATENT DOCUMENTS

| 11,304,219 B2 * | 4/2022 | Fakoorian | ......... H04W 72/1268 |
| 2019/0104498 A1 * | 4/2019 | Jung | ..................... H04L 5/0053 |

(Continued)

FOREIGN PATENT DOCUMENTS

| EP | 3945744 A1 * | 2/2022 | ........ H04W 72/0446 |
| WO | WO-2018141595 A1 * | 8/2018 | .......... H04W 72/042 |
| WO | WO-2021179325 A1 * | 9/2021 | |

OTHER PUBLICATIONS

PCT/IB2021/054926, "Notification of Transmittal of the International Search Report and the Written Opinion of the International Searching Authority, or the Declaration", International Searching Authority, Sep. 1, 2021, pp. 1-12.

(Continued)

*Primary Examiner* — Mohammad S Adhami
*Assistant Examiner* — Vladislav Y Agureyev
(74) *Attorney, Agent, or Firm* — Kunzler Needham Hilton

(57) ABSTRACT

Apparatuses, methods, and systems are disclosed for indicating a repetition scheme for a scheduled set of TBs. One apparatus includes a receiver that receives control signaling containing scheduling information for the transmission of a set of transport blocks ("TBs") over a plurality of transmission occasions and receives repetition information that schedules time-domain repetition of the set of TBs. The apparatus includes a processor that determines, for each TB in the set of TBs, whether to apply the time-domain repetition based on time-domain resources allocated for each TB and controls a transmitter to transmit the set of TBs in accordance with the scheduling information and the repetition information.

17 Claims, 9 Drawing Sheets

(56) References Cited

U.S. PATENT DOCUMENTS

| | | | | |
|---|---|---|---|---|
| 2019/0158331 A1* | 5/2019 | Pawar | | H04L 27/2605 |
| 2019/0274032 A1* | 9/2019 | Chatterjee | | H04L 5/00 |
| 2020/0107268 A1* | 4/2020 | Lee | | H04W 48/20 |
| 2020/0313793 A1* | 10/2020 | Jung | | H04L 1/189 |
| 2020/0314859 A1* | 10/2020 | Choe | | H04W 28/04 |
| 2021/0045110 A1* | 2/2021 | Fröberg Olsson | | |
| | | | | H04W 72/0446 |
| 2021/0051525 A1* | 2/2021 | Cao | | H04W 72/542 |
| 2021/0076409 A1* | 3/2021 | Goto | | H04W 72/1268 |
| 2021/0105104 A1* | 4/2021 | Cao | | H04L 5/0005 |
| 2021/0160917 A1* | 5/2021 | Goto | | H04W 72/0446 |
| 2021/0282137 A1* | 9/2021 | Wang | | H04W 72/23 |
| 2021/0298052 A1* | 9/2021 | Namba | | H04L 1/1851 |
| 2021/0307108 A1* | 9/2021 | Babaei | | H04W 76/18 |
| 2021/0315049 A1* | 10/2021 | Wei | | H04W 76/27 |
| 2021/0337428 A1* | 10/2021 | Li | | H04W 72/0446 |
| 2021/0368534 A1* | 11/2021 | Sato | | H04W 72/569 |
| 2021/0377979 A1* | 12/2021 | Bhamri | | H04L 5/0053 |
| 2022/0015065 A1* | 1/2022 | Wang | | H04W 72/0446 |
| 2022/0132533 A1* | 4/2022 | Taherzadeh Boroujeni | | |
| | | | | H04L 5/1469 |
| 2022/0132590 A1* | 4/2022 | Chen | | H04L 1/1893 |
| 2022/0159706 A1* | 5/2022 | Panteleev | | H04L 5/0094 |
| 2022/0394708 A1* | 12/2022 | Gao | | H04W 72/0446 |
| 2023/0047985 A1* | 2/2023 | Hu | | H04W 52/262 |
| 2023/0156441 A1* | 5/2023 | Lee | | H04W 72/02 |
| | | | | 370/329 |
| 2023/0239080 A1* | 7/2023 | Marinier | | H04L 1/189 |
| | | | | 714/748 |
| 2023/0300834 A1* | 9/2023 | Blankenship | | H04L 5/0044 |
| | | | | 370/329 |

OTHER PUBLICATIONS

Nokia et al., "Summary of Friday offline discussion on potential enhancements for PUSCH for NR URLLC (AI 7.2.6.1.3)", 3GPP TSG-RAN WG1 Meeting #96 R1-1903797, Feb. 25-Mar. 1, 2019, pp. 1-39.

Intel Corp, "Enhancements to configured grants for NR-unlicensed", 3GPP TSG RAN WG1 Meeting #101-e R1-2003731, May 25-Jun. 5, 2020, pp. 1-4.

Ericsson, "HARQ Enhancement", 3GPP TSG-RAN WG1 Meeting #101-e R1-2003845, May 25-Jun. 5, 2020, pp. 1-9.

Nokia et al., "New WID on enhanced Industrial Internet of Things (IoT) and URLLC support", 3GPP TSG RAN Meeting #86 RP-193233, Dec. 9-12, 2019, pp. 1-5.

3GPP, "3rd Generation Partnership Project; Technical Specification Group Radio Access Network; Study on physical layer enhancements for NR ultra-reliable and low latency case (URLLC) (Release 16)", 3GPP TR 38.824 V16.0.0, Mar. 2019, pp. 1-78.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

* cited by examiner

Slot N

P1,R1          P1,R2

Slot N+1

P2,R1          P2,R2          P3,R1

Slot N+2

P3,R2          P4,R1          P4,R2

1100

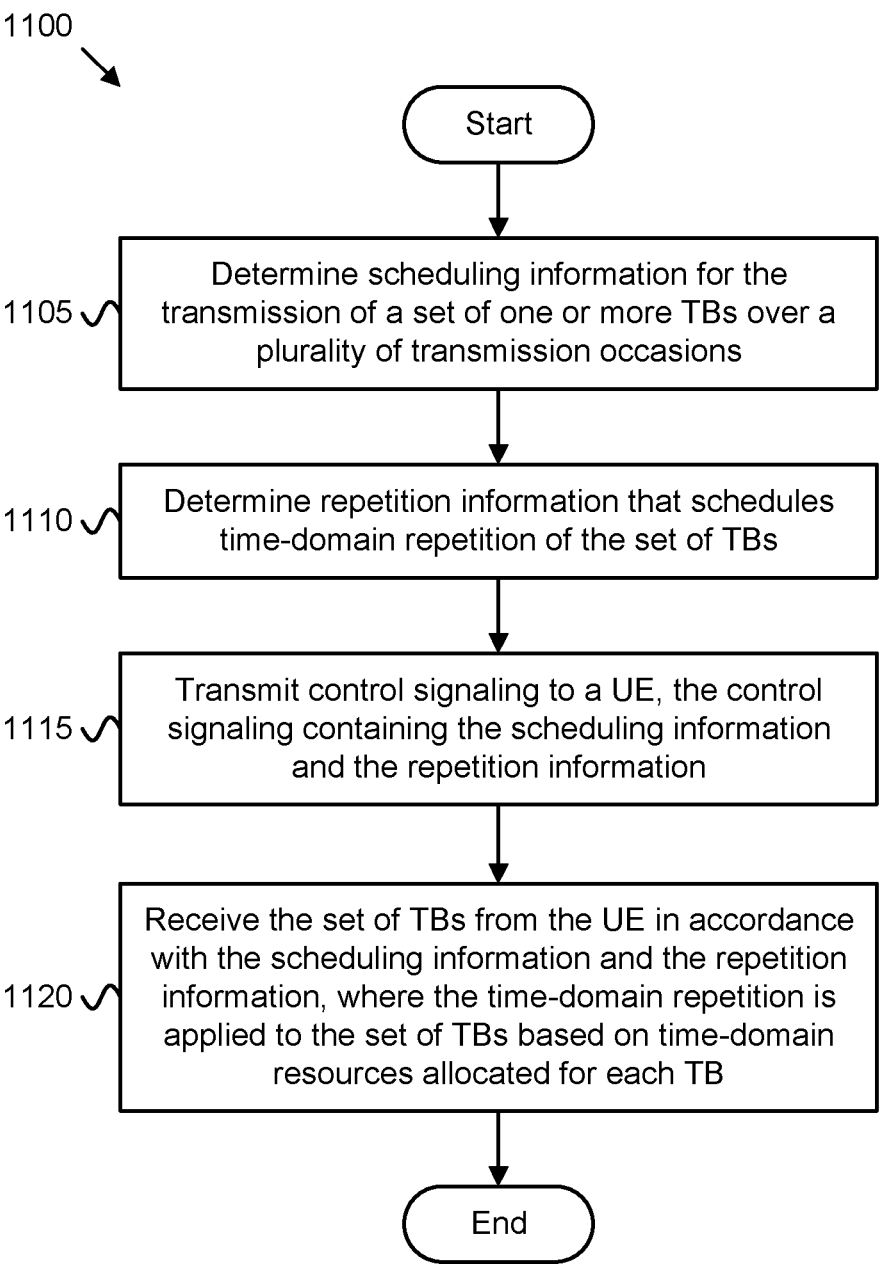

Start

1105 ⟲ Determine scheduling information for the transmission of a set of one or more TBs over a plurality of transmission occasions 1110 ⟲ Determine repetition information that schedules time-domain repetition of the set of TBs 1115 ⟲ Transmit control signaling to a UE, the control signaling containing the scheduling information and the repetition information 1120 ⟲ Receive the set of TBs from the UE in accordance with the scheduling information and the repetition information, where the time-domain repetition is applied to the set of TBs based on time-domain resources allocated for each TB End

FIG. 11

TIME-DOMAIN REPETITION OF A SET OF TRANSPORT BLOCKS

CROSS-REFERENCE TO RELATED APPLICATIONS

This application claims priority to U.S. Provisional Patent Application No. 63/034,881 entitled "PUSCH SCHEDULING IN NR-U URLLC OPERATION" and filed on Jun. 4, 2020 for Ankit Bhamri, Hyejung Jung, and Alexander Johann Maria Golitschek Edler von Elbwart, which application is incorporated herein by reference.

FIELD

The subject matter disclosed herein relates generally to wireless communications and more particularly relates to scheduling resources on a shared channel, e.g., for coverage enhancement and/or during Ultra-Reliable Low-Latency Communication ("URLLC") service and/or operation on unlicensed (i.e., shared) radio spectrum.

BACKGROUND

In certain wireless communication systems, a User Equipment ("UE") may be allocated uplink resources on a Physical Uplink Shared Channel After performing PUSCH transmission of a transport block ("TB"), the UE may receive feedback, such as Hybrid Automatic Repeat Request ("HARQ") feedback. Here, a positive acknowledgement (i.e., "ACK") indicates successful reception of the TB, while a negative acknowledgement (i.e., "NACK") indicates that the TB was not successfully received by the network. Upon receiving a NACK, the UE may repeat transmission of the TB. However, the delay associated with waiting for HARQ feedback and retransmitting a TB may be unacceptable for certain low-latency services.

Additionally, in some networks the UE service may be supplemented by operation on unlicensed spectrum. However, operation on unlicensed spectrum requires Clear Channel Assessment ("CCA") prior to transmission, for example involving a Listen-Before-Talk ("LBT") procedure. If the CCA/LBT procedure fails immediately prior to a scheduled transmission, then the UE must wait until a later transmission opportunity to send the TB. However, the delay associated with waiting for a next transmission opportunity may be unacceptable for certain low-latency services.

BRIEF SUMMARY

Disclosed are procedures for indicating a repetition scheme for a scheduled set of transport blocks ("TBs"). Said procedures may be implemented by apparatus, systems, methods, or computer program products.

One method of a User Equipment ("UE") includes receiving control signaling containing scheduling information for the transmission of a set of transport blocks ("TBs") over a plurality of transmission occasions. The first method includes receiving repetition information that schedules time-domain repetition of the set of TBs and determining, for each TB in the set of TBs, whether to apply the time-domain repetition based on time-domain resources allocated for each TB. The first method includes transmitting the set of TBs in accordance with the scheduling information and the repetition information.

One method of a Radio Access Network ("RAN") node includes determining scheduling information for the transmission of a set of TBs over a plurality of transmission occasions and determining repetition information that schedules time-domain repetition of the set of TBs. The second method includes transmitting, to a UE, control signaling containing the scheduling information and the repetition information and receiving, from the UE, the set of TBs in accordance with the scheduling information and the repetition information, where the time-domain repetition is applied to the set of TBs based on time-domain resources allocated for each TB.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 11 is a flowchart diagram illustrating one embodiment of a second method for indicating a repetition scheme for a scheduled set of TBs.

DETAILED DESCRIPTION

Figure 1:
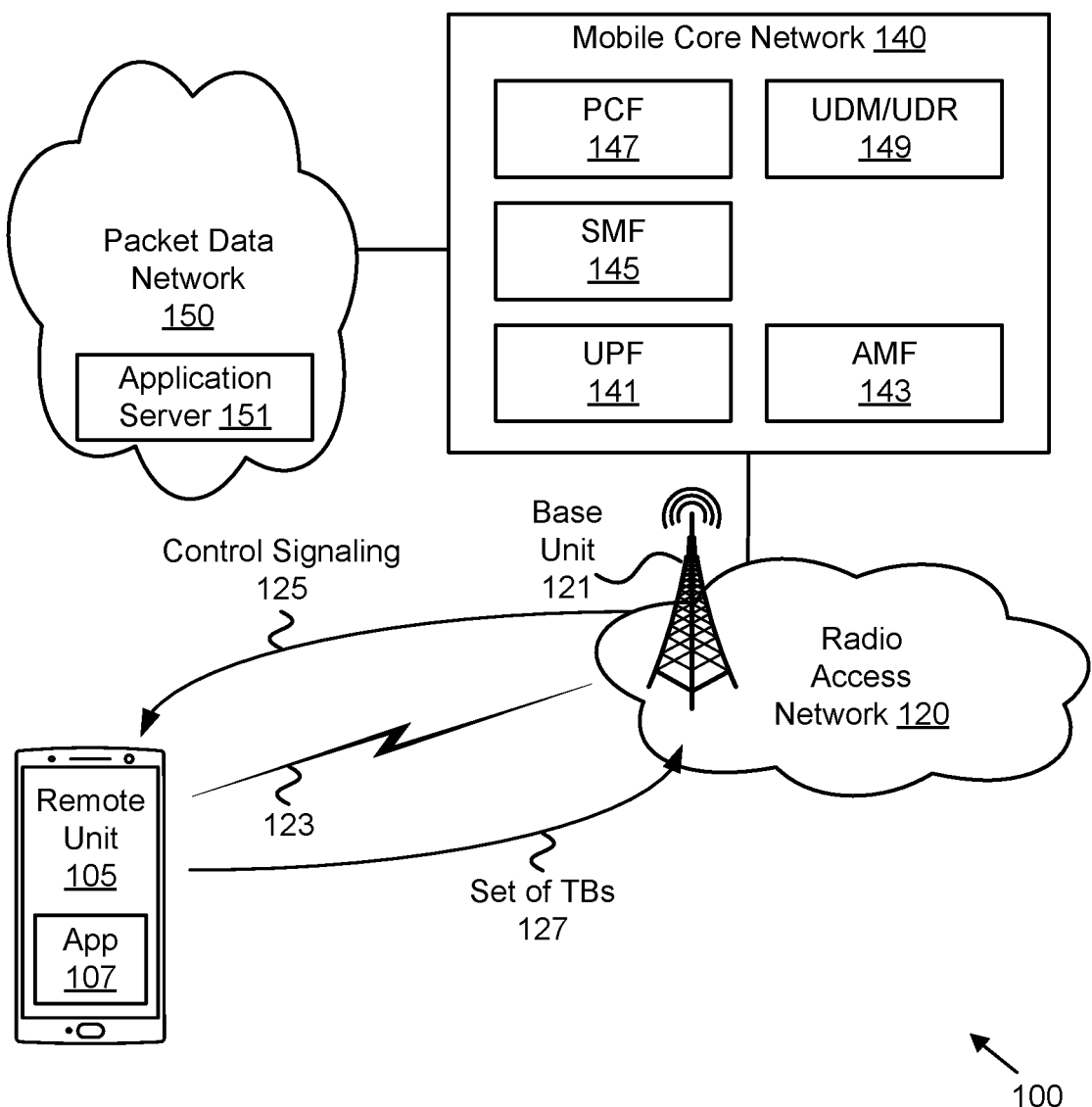
FIG. 1 is a schematic block diagram illustrating one embodiment of a wireless communication system for indicating a repetition scheme for a scheduled set of TBs.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for indicating a repetition scheme for a scheduled set of TBs. For enhancement of Industrial Internet of Things ("IIoT") and Ultra-Reliable Low-Latency Communication ("URLLC") support, the present solutions address the issue of Physical Uplink Shared Channel ("PUSCH") scheduling compatibility based on Third Generation Partnership Project ("3GPP") Release 16 ("Rel-16") enhancements for New Radio ("NR") operation in Unlicensed Spectrum ("NR-U") and URLLC. The present solutions also support coverage enhancement.

To enhance signaling efficiency, scheduling multiple PUSCH transmissions (referred to as "multi-PUSCH") by a single instance of control signaling, such as by single DCI, is be supported to allow multiple transport blocks to be scheduled in multiple Transmit Time Intervals ("TTIs"), such as slots, in a contiguous manner using a single scheduling grant (e.g., DCI or CG) for PUSCH. In NR-based Radio Access Technology ("RAT"), the TTI (also referred to as a transmission occasion) may be a slot, a mini-slot, of other grouping of symbols. In the following descriptions, the terms "slot" or "slots" is used for the TTI, but it is replaceable by any other grouping of time-domain resources, e.g., subframe, mini-slot, shortened TTI, transmission occasion, etc.

Additionally, PUSCH repetition schemes may be enhanced to allow low-latency repetition of same transport block in a contiguous manner for slot-based repetitions (referred to as Repetition Type-A) and/or intra-slot repetitions (referred to as Repetition Type-B), e.g., using a single scheduling grant (e.g., DCI or CG) for PUSCH. Note that 3GPP Releases 16 and 17 ("Rel-16/17") do not specified on how the two features are compatible. Therefore, the present disclosure addresses how to handle the time-domain resource allocation when a UE is configured and indicated with multi-PUSCH scheduling and repetition of PUSCH to satisfy URLLC requirements in NR-U.

Additionally, transmission of single TB across multiple TTIs is not supported in Releases 15 and 16 ("Rel-15/16"). Beneficially the solutions described herein may also be applied to scheduling a single TB over multiple PUSCH/TTI to improve coverage and reduce latency.

To remedy the above problems, a new UE and/or RAN behavior is proposed for time-domain resource allocation when UE is configured and/or indicated with multiple PUSCH scheduling as well as repetition using a single instance of control signaling. Currently the two features, i.e., multi-PUSCH scheduling and repetition of PUSCH are separately specified and the current specification does not support the behavior on how to handle the two features together, especially in terms of time-domain resource allocation.

New UE and/or RAN behavior includes schemes to handle multiplexing of different PUSCHs (different TBs) and their corresponding repetitions. New behavior may also include selective repetition of certain PUSCHs depending on
   i. NDI bits for each of the PUSCH and/or
   ii. Priority level of each PUSCH
   iii. Mapping type (A or B) of each PUSCH and repetition type (A or B)

The new UE and/or RAN behavior includes schemes to schedule a single TB over multiple PUSCHs by a single instance of control signaling. Additionally, such schemes may schedule repetition of the single TB using the single instance of control signaling.

The new UE/RAN behavior may also include Priority indication for multiple scheduled PUSCHs.

FIG. 1 depicts a wireless communication system 100 for indicating a repetition scheme for a scheduled set of TBs, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the RAN 120 (i.e., via base unit 121) may send control signaling 125 for multi-PUSCH to the remote unit 105, wherein the remote unit 105 sends a set 127 of TBs to the base unit 121 according to scheduling information and repetition information in the control signaling 125. In certain embodiments, the control signaling 125 includes dynamic indications which may be used with semi-statically configured factors to determine a repetition scheme for the set 127 of TBs, as described in further detail below.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed (i.e., shared) radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single mobile network operator, such as a Public Land Mobile Network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

While FIG. 1 depicts components of a 5G RAN and a 5G core network, the described embodiments for indicating a repetition scheme for a scheduled set of TBs apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting indicating a repetition scheme for a scheduled set of TBs.

Figure 2:
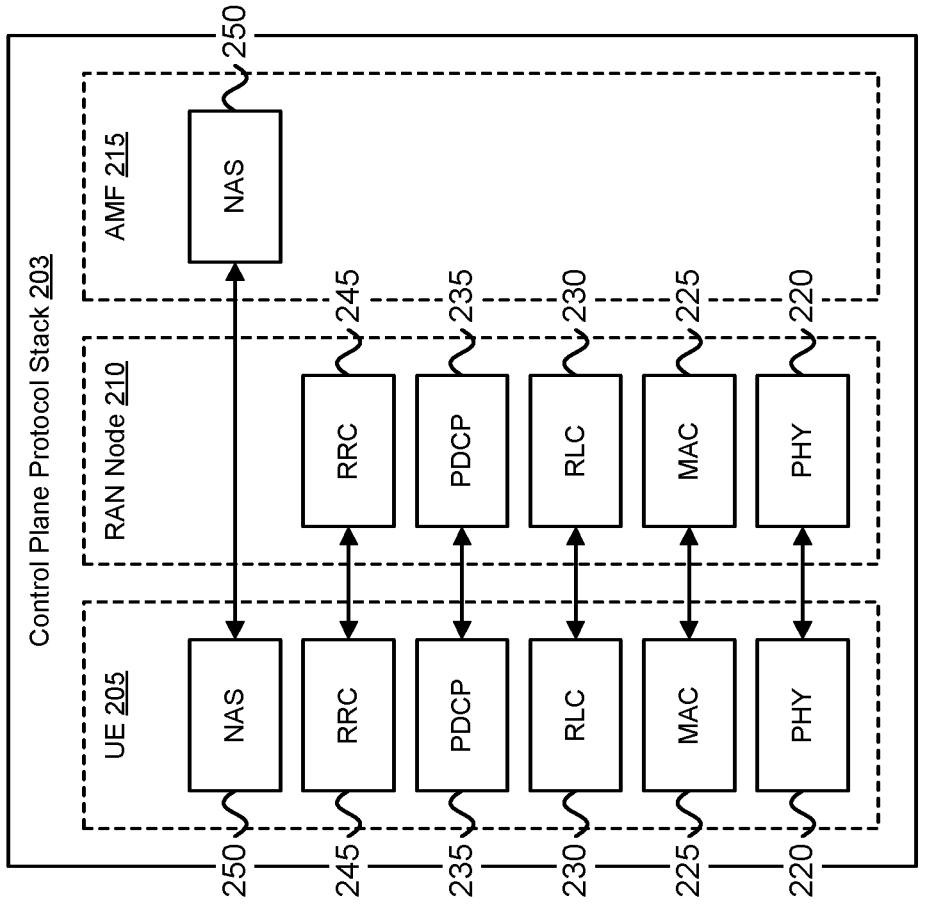
FIG. 2 is a block diagram illustrating one embodiment of a 5G New Radio ("NR") protocol stack.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. During NR-U operation, the physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Regarding time-domain resource allocation, described herein are time-domain resource allocation schemes to schedule multiple PUSCH with different transport blocks ("TBs") and repetitions of one or more of the scheduled transport blocks using a single instance of control signaling (e.g., DCI and/or CG) when multiple start and length indicator values ("SLIVs") are indicated by a row of time-domain resource allocation table ("TDRA") corresponding to different TBs and additionally a repetition factor is either dynamically or semi-statically configured/indicated.

In some embodiments, multiple PUSCHs are scheduled, e.g., one TB/PUSCH and repetition of at least some PUSCHs. These embodiments are highly relevant for URLLC operation. In other embodiments, multiple PUSCHs are scheduled with one TB scheduled for the multiple PUSCHs and repetitions of at least one TB/multiple PUSCHs. These embodiments are highly relevant for coverage enhancement. Although the solutions and embodiments here discuss scheduling from mainly PUSCH perspective, but they are applicable to other physical shared channels as well such as the Physical Downlink Shared Channel ("PDSCH") and the Physical Sidelink Shared Channel ("PUSCH").

In the following descriptions, the terms "DCI" is used for the single instance of control signaling, but it is replaceable by any other scheduling grant, e.g., DCI format 0_0, DCI format 0_1, UL grant in Random Access Response ("RAR") message, configured grant type 1, configured grant type 2, etc.

According to 3GPP Rel-16 NR URLLC, the following agreements related to PUSCH enhancements and corresponding time-domain resource allocation have been made:

One PUSCH transmission instance is not allowed to cross the slot boundary at least for grant based PUSCH. One or more actual PUSCH repetitions in one slot, or two or more actual PUSCH repetitions across slot boundary in consecutive available slots, is supported using one UL grant for dynamic PUSCH, and one configured grant configuration for configured grant PUSCH.

For the above, dynamic indication of the nominal number of repetitions in the DCI scheduling dynamic PUSCH is supported for PUSCH enhancements. Moreover, the time domain resource assignment (TDRA) field in the DCI or the TDRA parameter in the type 1 configured grant indicates the resource for the first "nominal" repetition. Note, however, that PUSCH mapping Type-A is not supported for the above option.

Regarding the interpretation of the parameters L and K for all PUSCH transmissions, in one embodiment the time window within which valid symbols are used for transmission is L*K. In another embodiment, the time window within which valid symbols are used for transmission can be longer than L*K symbols, and it is extended at least in case of semi-static DL symbols. For the Rel-16 PUSCH with enhanced repetition transmission, the time window within which valid symbols are used for transmission is L*K, starting from the first symbol indicated by the SLIV in TDRA field.

It is agreed that Rel-16 enhanced PUSCH scheme (including dynamic indication of the number of repetitions) is supported for DCI format 0_1 and new UL DCI format (for DG and type 2 CG). It is further agreed that Rel-16 enhanced PUSCH scheme is not supported for DCI format 0_0 for dynamic grant ("DG") and type 2 Configured Grant ("CG").

For the dynamic indication of the number of repetitions for dynamic grant, it is agreed to support jointly coded with SLIV in TDRA table, by adding an additional column for the number of repetitions in the TDRA table. The maximum TDRA table size is 64.

It is agreed to support dynamic indication of the number of repetitions for 3GPP Release 15 ("Rel-15") PUSCH with slot aggregation using DCI formats 0_1 & the new UL DCI format. The dynamic indication is done by using the same Rel-16 mechanism (e.g., jointly coding the number of repetitions with SLIV in TDRA table).

Regarding CG PUSCH transmission, for the initial Type 2 CG PUSCH transmission, the TDRA table follows the activating DCI. Additionally, for the initial Type 2 CG PUSCH transmission with PUSCH repetition Type-A or Type-B, the number of repetitions is provided by the activating DCI via parameter numberofrepetitions if it is present in the corresponding TDRA table; otherwise, the number of repetitions is provided by parameter repK.

For the initial Type 1 CG PUSCH transmission with PUSCH repetition Type-B, if one and only one of DCI formats 0_1 and 0_2 is configured with PUSCH repetition Type-B, the TDRA table corresponding to the DCI format (0_1 or 0_2) configured with PUSCH repetition Type-B is used. If both DCI formats 0_1 and 0_2 are configured with PUSCH repetition Type-B, the TDRA table corresponding to DCI format 0_1 is used.

For the initial Type 1 CG PUSCH transmission with PUSCH repetition Type-B, the case of none of the DCI formats 0_1 and 0_2 is configured with PUSCH repetition Type-B is an error case. For the initial Type 1 CG PUSCH transmission, if it is configured with PUSCH repetition Type-A, use the TDRA table for User-specific Search Space ("USS") in Rel-15. For the initial Type 1 CG PUSCH transmission with PUSCH repetition, the number of repetitions is provided via parameter numberofrepetitions if it is present in the corresponding TDRA table; otherwise, the number of repetitions is provided by parameter repK.

In URLLC in Rel-16, TDRA has been enhanced to indicate repetition factor (but still with single SLIV). This disclosure provides new details when this aspect needs to be combined with the enhancement in NR-U in Rel-16 to indicate multiple PUSCHs/slots using TDRA table.

In various embodiments, the column on the number of repetitions numberofrepetitions is always present in parameter PUSCH-TimeDomainResourceAllocationList-ForDCIformat0_1 and parameter PUSCH-TimeDomainResourceAllocationList-ForDCIformat0_2.

For a dynamic grant with PUSCH repetition Type-A, if numberofrepetitions is present in the corresponding TDRA table, the number of repetitions is given by numberofrepetitions. Elseif the UE is configured with pusch-AggregationFactor, the number of repetitions is given by pusch-AggregationFactor. Otherwise, the number of repetitions is 1.

For a dynamic grant with PUSCH repetition Type-B, the number of repetitions is given by numberofrepetitions. Note that pusch-TimeDomainAllocationList-ForDCIformat0_1/2 needs to be configured for PUSCH repetition Type-B.

For PUSCH repetition Type-A and Type-B, the number of bits to indicate numberofrepetitions is 3. {1, 2, [3], 4, [6], 7, [8], 12, 16} are supported. In some embodiments, for PUSCH repetition Type-B, L<=14.

For indicating S and L in the TDRA table for PUSCH repetition Type-B, S and L are separately indicated (4-bit for S and 4-bit for L). S is from 0 and [13], L is from [1] to 14. Note that additional restrictions for a particular waveform and/or Demodulation Reference Signal ("DMRS") mapping type from Rel-15 may still be applicable.

In certain embodiments, for numberofrepetitions for PUSCH repetition Type-A and Type-B, {3, 8} are additionally supported. That is, {1, 2, 3, 4, 7, 8, 12, 16} are supported for numberofrepetitions.

In some embodiments, for PUSCH with repetition Type B, a UE is not expected to be indicated with an antenna port configuration that is invalid for the duration of any actual repetition. In certain embodiments, for PUSCH with repetition Type B, an actual repetition with a single symbol is not transmitted.

According to Rel. 16 NR-U, the following agreements related to multi-PUSCH scheduling and corresponding time-domain resource allocation have been made:

For signaling the number of scheduled PUSCHs and TDRA in one DCI scheduling multiple PUSCHs, the TDRA table is extended such that each row indicates multiple PUSCHs (continuous in time-domain). In some embodiments, each scheduled PUSCH has a separate SLIV and mapping type. The number of scheduled PUSCHs is signaled by the number of indicated valid SLIVs in the row of the TDRA table signaled in DCI.

For scheduling multiple PUSCHs by a single DCI Format 0_1, the same DCI Format 0_1 can schedule a single PUSCH or multiple PUSCHs. The maximum number of PUSCHs that can be configured in a row of the TDRA table may be 8. Additionally, the number of NDI bits and RV bits in DCI format 0_1 is determined based on the configured TDRA table.

i. 1 RV bit per PUSCH in case multiple PUSCHs are scheduled ii. 2 RV bits for the PUSCH in case only a single PUSCH is scheduled The TDRA table configuration allows indicating single or multiple continuous PUSCHs in any slot of the multiple scheduled slots.

For signaling the number of scheduled PUSCHs and TDRA in one DCI format 0_1 scheduling multiple PUSCHs, the TDRA table is extended such that each row indicates multiple PUSCHs (continuous in time-domain). Each PUSCH has a separate SLIV and mapping type. The number of scheduled PUSCHs is signaled by the number of indicated valid SLIVs in the row of the TDRA table signaled in DCI. Note that for the fallback DCI, Rel-15 TDRA table may be used.

An important distinction of the below solutions in comparison to repetition schemes for URLLC in Rel-16/15 is that in the below solutions, multiple SLIVs are used to indicate multiple PUSCHs. Note that a scheduled TB may span more than one slot/TTI.

According to a first solution, a repetition scheme for multiple PUSCH transmissions is dynamically scheduled by a single instance of control signaling, such as by single DCI. According to a second solution, a selective repetition scheme for multiple PUSCH transmissions is dynamically scheduled by a single instance of control signaling, such as by single DCI. According to a third solution, a priority scheme for multiple PUSCH transmissions is dynamically scheduled by a single instance of control signaling, such as by single DCI.

Described herein is a first subset of the first solution, referred to as "Solution 1a", characterized by scheduling a repetitions second." As noted above, a scheduled TB may span multiple slots.

According to Solution 1a, when UE is indicated with multiple SLIVs and corresponding mapping types by a single row of TDRA table in the scheduling grant (e.g., DCI or CG) and additionally a repetition factor is indicated by the row of the TDRA table, then the UE first allocates time-domain resources for the multiple PUSCHs with different TBs in a contiguous manner, followed by repetition of all the scheduled PUSCHs. The repetition scheme Type-A (i.e., slot-based repetition) or Type-B (i.e., non-slot-based repetition) may be applied to multi-PUSCH scheduling according to this Solution.

In the example, when PUSCH Type-B repetition is applied, then the nominal repetition length for a given PUSCH and repetitions corresponds to the indicated length parameter L, but the starting symbol of subsequent repetitions of a given PUSCH can be same or different than indicated starting symbol parameter S. Note that the actual length for repetition of any PUSCH may be shorter than the nominal length depending up on segmentation due to slot boundary, invalid symbols, or any unavailable symbols for UL transmission. In certain embodiments of Solution 1a, the repetition mechanism of each of the PUSCH follows the current PUSCH repetition Type-B as specified in 3GPP Technical Specification ("TS") 38.214 v 16.1.0.

Figures 3, 4:
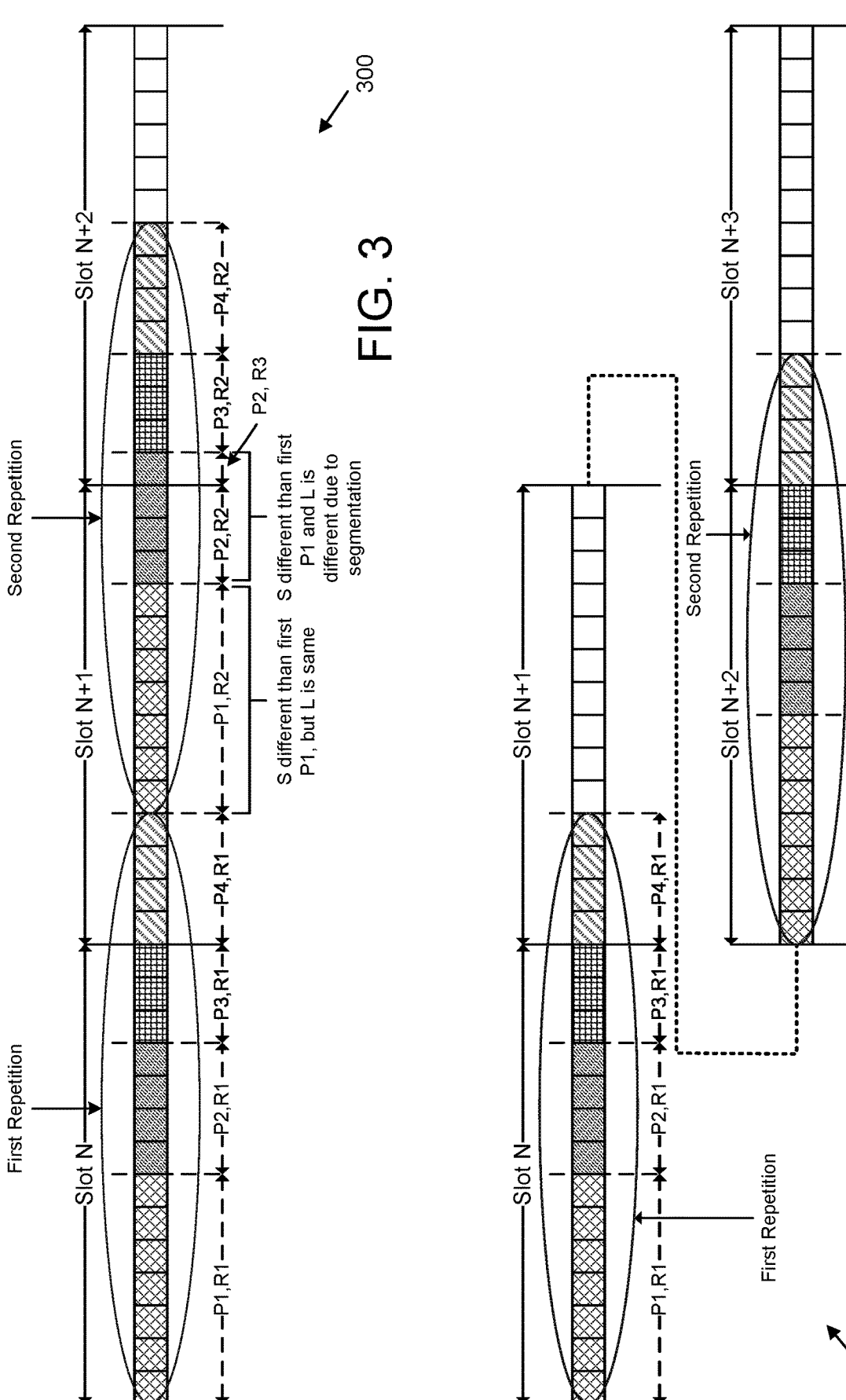
FIG. 3 is diagram illustrating one embodiment of time-domain resource allocation with repetition Type-B.
FIG. 4 is diagram illustrating one embodiment of time-domain resource allocation with repetition type-A.
Figure 5:
FIG. 5 is diagram illustrating another embodiment of time-domain resource allocation with repetition Type-B.

FIG. 3 depicts an example of time-domain resource allocation 300 for with repetition Type-B, according to embodiments of Solution 1a. As depicted, the repetition scheme used in the time-domain resource allocation 300 schedules multi-PUSCH first and repetitions second. Note that repetition Type-B supports repetitions within a slot, as depicted in FIG. 3. In one embodiment, repetition Type-B is configured in a way so that intra-slot transmission may align with slot boundaries, as depicted in FIG. 5. In other embodiments, repetition Type-B may cause a PUSCH transmission to cross a slot boundary, as depicted in FIG. 3. In certain embodiments, repetition Type-B may use mini-slot-based repetition.

As described above, the TDRA table may include a mapping type indicating a particular repetition scheme. For example, when a row of TDRA table indicates the corresponding fields and values as shown by index 1 of Table 1 (below) and PUSCH repetition Type-B (with no invalid symbols) according to the 3GPP TS 38.214 v16.1.0 is indicated/configured to the UE, then the time-domain resource allocation for multiple PUSCH transmissions and corresponding repetitions is illustrated in FIG. 3.

TABLE 1

| | | | | | | | | | | | | | |
|---|---|---|---|---|---|---|---|---|---|---|---|---|---|
| Example of TDRA row index for multi-PUSCH scheduling with repetition factor | | | | | | | | | | | | | |
| | | PUSCH-1 (P1) with TB1 | | | PUSCH-2 (P2) with TB2 | | | PUSCH-3 (P3) with TB3 | | | PUSCH-4 (P4) with TB4 | | |
| Row Index | K2 | Mapping type | S | L | Mapping type | S | L | Mapping type | S | L | Mapping type | S | L | Repetition Factor (R) |
| 1 | 1 | B | 0 | 7 | B | 7 | 4 | B | 11 | 3 | B | 0 | 4 | 2 | first instance of each TB/PUSCH transmission of the multi-PUSCH grant before scheduling a repetition of any TB/PUSCH transmission of the multi-PUSCH grant. This scheme is also referred to herein as "multi-PUSCH first, In one implementation of the Solution 1a, the number of repetitions may be indicated in a dynamic manner by the TDRA table, for example as disclosed in Table 1, above. When both multiple SLIVs and one repetition factor are indicated, then the SLIVs are for multiple PUSCHs and the indicated repetition factor is applied to all PUSCHs. In an alternative implementation, the number of repetitions may be indicated in a semi-static manner by higher-layer signaling (e.g., RRC signaling).

In another embodiment of Solution 1a, if mapping Type-B is indicated for any of the multiple PUSCHs transmission by the indicated row in the TDRA table, then the UE 205 is not expected to be configured/indicated with PUSCH repetition Type-A.

FIG. 4 depicts an example of time-domain resource allocation 400 for multi-PUSCH first, repetition second with repetition Type-A, according to embodiments of the disclosure. The time-domain resource allocation 400 is according to Solution 1a. Note that repetition Type-B is slot-based repetition. However, a size of a PUSCH transmission may be based on a mini-slot.

In some embodiments of Solution 1a, when PUSCH repetition Type-A is configured/indicated to the UE with multi-PUSCH scheduling, then the all the PUSCH transmissions with different TBs are contiguous in time. For repetition Type-A, the repetitions are slot-based and not necessarily contiguous in time. For this implementation scenario, the same SLIV is applicable to first transmission of a given PUSCH and corresponding repetitions. For example, when a row of TDRA table indicates the corresponding fields and values as shown by index 1 of Table 2 (below) and PUSCH repetition Type-A is configured/indicated to the UE, then the time domain resource allocation is as illustrated in FIG. 4.

TABLE 2

| Example of TDRA row index for multi-PUSCH scheduling with repetition factor | | | | | | | | | | | | | |
| | | PUSCH-1 (P1) with TB1 | | | PUSCH-2 (P2) with TB2 | | | PUSCH-3 (P3) with TB3 | | | PUSCH-4 (P4) with TB4 | | | |
| Row Index | K2 | Mapping type | S | L | Mapping type | S | L | Mapping type | S | L | Mapping type | S | L | Repetition Factor (R) |
| 1 | 1 | A | 0 | 7 | A | 7 | 4 | A | 11 | 3 | A | 0 | 4 | 2 |

In one implementation, the number of repetitions may be indicated in a dynamic manner by the TDRA table, for example as disclosed in Table 2, above. Again, when both multiple SLIVs and one repetition factor indicated, then the SLIVs are for multiple PUSCHs and the indicated repetition factor is applied to all PUSCHs. In an alternative implementation, the number of repetitions may be indicated in a semi-static manner by higher-layer signaling (e.g., RRC signaling).

In another embodiment of Solution 1a, if mapping Type-A is indicated for any of the multiple PUSCHs transmission by the indicated row in the TDRA table, then the UE 205 is not expected to be configured/indicated with PUSCH repetition Type-B.

Described herein is a second subset of the first solution, referred to as "Solution 1b", characterized by scheduling repetitions first and multi-PUSCH second. As noted above, a scheduled TB may span multiple slots.

According to Solution 1b, when UE is indicated with multiple SLIVs and corresponding mapping types by a single row of TDRA table in the scheduling DCI and additionally a repetition factor is indicated by the row of the TDRA table, then the UE first allocates time-domain resources for the first PUSCHs and corresponding repetitions. Following the repetition of first PUSCH, time-domain resources are allocated for the next PUSCH with different TB and its corresponding repetitions and so on.

In comparison to Solution 1a, here repetition first is followed by different PUSCH transmission. For example, in one implementation of Solution 1b, when a row of TDRA table indicates the corresponding fields and values as shown by index 1 of Table 3 (below) and PUSCH repetition Type-B (with no invalid symbols) according to the 3GPP TS 38.214 v16.1.0 is indicated/configured to the UE, then the time-domain resource allocation for multiple PUSCH transmissions and corresponding repetitions is illustrated in FIG. 5 according to this scheme of scheduling repetitions first.

TABLE 3

Example of TDRA row index for multi-PUSCH scheduling with repetition factor

| Row Index | K2 | PUSCH-1 (P1) | | | PUSCH-2 (P2) | | | PUSCH3 (P3) | | | PUSCH4 (P4) | | | Repetition Factor (R) |
|---|---|---|---|---|---|---|---|---|---|---|---|---|---|---|
| | | Mapping type | S | L | Mapping type | S | L | Mapping type | S | L | Mapping type | S | L | |
| 1 | 1 | B | 0 | 7 | B | 0 | 4 | B | 8 | 6 | B | 6 | 4 | 2 |

FIG. 5 depicts an example of time-domain resource allocation 500 for repetition first, multi-PUSCH second with repetition Type-B, according to embodiments of Solution 1b. As noted above, with repetition Type-B, repetition may occur within the same slot. The time-domain resource allocation 500 is according to the first solution, where a repetition scheme for all PUSCHs is scheduled by a single DCI.

Figure 6:
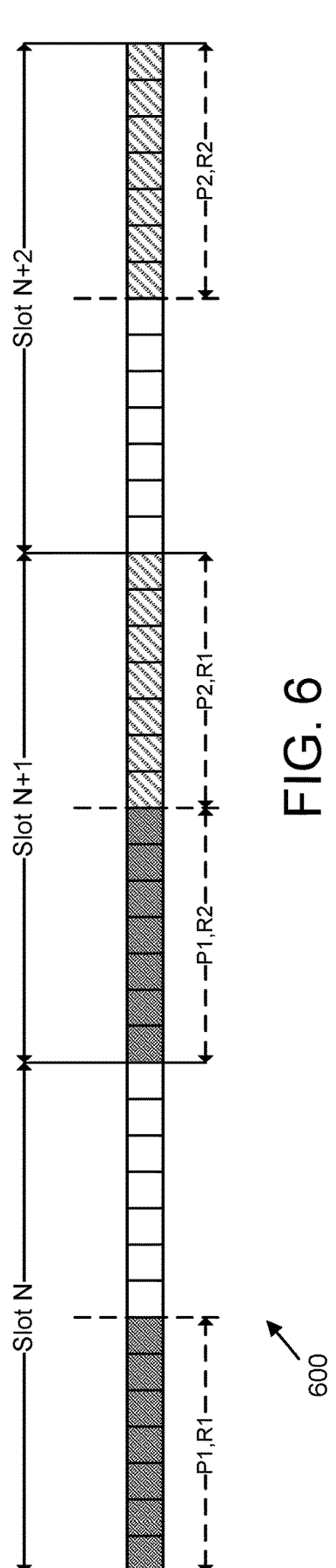
FIG. 6 is diagram illustrating another embodiment of time-domain resource allocation with repetition Type-A.

FIG. 6 depicts an example of time-domain resource allocation 600 for repetition first, multi-PUSCH second with repetition Type-A, according to embodiments of the disclosure. The time-domain allocation 600 is according to Solution 1b. Note that for a given PUSCH, its repetition is not within same slot, but the repetition of another PUSCH can be within same slot, as long as indicated UL symbols are available.

In one implementation of Solution 1b, when PUSCH repetition Type-A is configured/indicated to the UE with multi-PUSCH scheduling, then the time-domain resources are first allocated to the first PUSCH transmission according to the first indicated SLIV by row of the TDRA table, then then repetition of first PUSCH is allocated resources in the next available slot with the same SLIV. Then the time-domain resources for second PUSCH are allocated that are contiguous in time with respect to the last repetition of the first PUSCH. Same procedure is followed for the multiple PUSCHs and repetitions. An example for TDRA row and corresponding time-domain resource allocation are illustrated in Table 4 (below) and FIG. 6, respectively.

TABLE 4

Example of TDRA row index for multi-PUSCH scheduling with repetition factor

| Row Index | K2 | PUSCH-1 (P1) | | | PUSCH-2 (P2) | | | Repetition Factor (R) |
|---|---|---|---|---|---|---|---|---|
| | | Mapping type | S | L | Mapping type | S | L | |
| 1 | 1 | B | 0 | 7 | B | 7 | 7 | 2 |

In an alternative implementation, the number of repetitions may also be indicated in a semi-static manner by higher-layer signaling (e.g., RRC signaling).

In another implementation of Solution 1b, if mapping Type-A is indicated for any of the multiple PUSCHs transmission by the indicated row in the TDRA table, then UE is not expected to be configured/indicated with PUSCH repetition Type-B.

Described herein is a third subset of the first solution, referred to as "Solution 1c", characterized by multi-PUSCH scheduling of a single TB. Beneficially, Solution 1c supports coverage enhancement and improves the likelihood of successful transmission in operation of shared (i.e., unlicensed) spectrum.

According to Solution 1c, when UE is indicated with one SLIV and corresponding mapping type by a single row of TDRA table in the scheduling DCI and additionally a repetition factor is indicated by the row of the TDRA table, then the UE allocates time-domain resources for the single TB and corresponding repetitions. In one embodiment, the scheduled TB may span multiple slots, e.g., to support TB over Multi-Slots ("TBoMS"). Repetitions of the TB may be slot-based (i.e., repetition Type-A) or may support repetitions within a slot (i.e., repetition Type B).

As noted above, according to the second solution the UE receives an indication and/or configuration of a selective repetition scheme for multi-PUSCH. As used herein, "selective repetition" refers to different repetition factors being applied to different TB/PUSCH transmissions of the multi-PUSCH. In some embodiments, certain TBs are repeated with a greater frequency, while other TBs are repeated with a lesser frequency. In other embodiments, certain TBs are repeated while other TBs are not repeated.

Described herein is a first subset of the second solution, referred to as "Solution 2a", characterized by selective repetition scheme based on NDI values of PUSCHs scheduled by single DCI. As noted above, a scheduled TB may span multiple slots.

According to Solution 2a, when UE is indicated with multiple SLIVs and corresponding mapping types by a single row of TDRA table in the scheduling DCI, additionally a repetition factor is indicated by the row of the TDRA table and NDI bitmap is also indicated for multiple PUSCHs, then the repetition is scheduled only for the PUSCH for which the corresponding NDI bit is toggled, i.e., only for PUSCH where the new TB is transmitted (no retransmission).

Figure 7:
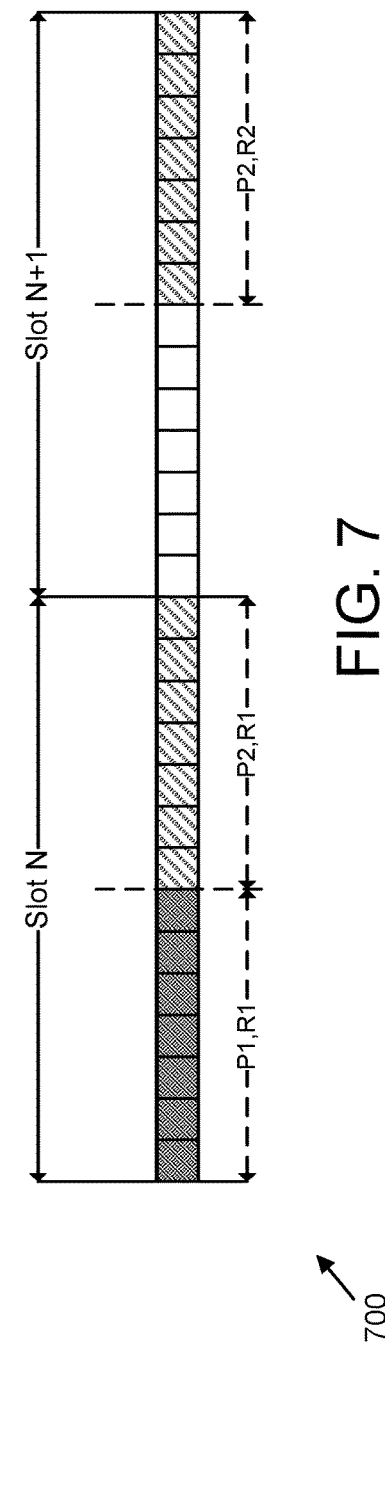
FIG. 7 is diagram illustrating one embodiment of NDI-toggled time-domain resource allocation.

FIG. 7 depicts an example of time-domain resource allocation 700 for selective repetition of new TBs for which NDI is toggled, according to embodiments of solution 2a. As depicted, the time-domain resource allocation 700 may be used with repetition Type-A for NDI toggled (new TB) only for second PUSCH. For example, for TDRA Table 4 (above), if the NDI is toggled only for 2nd PUSCH, then the time-domain resource allocation according to this Solution is illustrated in FIG. 7.

In some embodiments, the Solution 2a may be combined with the repetition first, multi-PUSCH second scheme discussed above with reference to FIGS. 5 and 6. In other embodiments, the Solution 2a may be combined with the multi-PUSCH first, repetition second scheme discussed above with reference to FIGS. 3 and 4. Put in other words, Solution 2a may be applied together with any of the schemes and implementations discussed above in Solution 1a and/or Solution 1b.

Described herein is a second subset of the second solution, referred to as "Solution 2b", characterized by selective repetition scheme based on intra-UE priority values of PUSCHs scheduled by single DCI. As noted above, a scheduled TB may span multiple slots.

According to Solution 2b, when UE is indicated with multiple SLIVs and corresponding mapping types by a single row of TDRA table in the scheduling DCI, additionally a repetition factor is indicated by the row of the TDRA table and UE is configured with intra-UE priority levels associated with different PUSCH (TB), then the repetition is scheduled only for the PUSCH with higher priority level.

In one implementation of this Solution 2b, UE is configured/indicated with a threshold for priority level. If the priority level associated with the scheduled TB is higher than or equal to the threshold, then only, the repetitions are performed for the corresponding PUSCH, otherwise, no repetitions are done for PUSCH with priority level below the threshold In another implementation of Solution 2b, just one of two priority levels can be associated with PUSCH, e.g., a first priority level could be eMBB and a second priority level could be URLLC. Whenever the given PUSCH has URLLC priority level, repetition is performed, otherwise no repetition for the given PUSCH with eMBB priority.

In an alternative implementation of Solution 2b, when each of the scheduled PUSCH is indicated with a certain priority level (as described below in the third solution), then the repetition factor associated those priority levels could be different. So, for example, URLLC priority level implies Rmax=4 and eMBB priority level implies Rmax=2. These different maximum repetitions (Rmax) values may be indicated additionally by an entry of the TDRA table. In an alternative implementation, the Rmax values may be indicated in a semi-static manner by higher-layer signaling (e.g., RRC signaling).

Note that Solution 2b may be applied together with any of the schemes and implementations discussed above in Solution 1a and/or Solution 1b and/or Solution 2a.

Described herein is a third subset of the second solution, referred to as "Solution 2c", characterized by selective repetition scheme based on mapping types of PUSCHs scheduled by single DCI. As noted above, a scheduled TB may span multiple slots.

According to Solution 2c, when UE is indicated with multiple SLIVs and corresponding mapping types by a single row of TDRA table in the scheduling DCI, additionally a repetition factor is indicated by the row of the TDRA table and UE is configured/indicated with PUSCH repetition Type-B, then the repetition is applied only for PUSCH with corresponding mapping Type-B. If there are multiple PUSCHs scheduled and they are associated with different mapping types, then PUSCH associated with mapping Type-A are not repeated with PUSCH repetition Type-B. Only the first instance is transmitted for such PUSCH.

Note that Solution 2c may be applied together with any of the schemes and implementations discussed above in Solution 1a and/or Solution 1b and/or Solution 2a and/or Solution 2b.

Described herein is a third Solution, characterized by use of a DCI format that schedules one or more PUSCHs carrying different transport blocks ("TBs") includes one or more priority indications, each priority indication corresponding to each scheduled PUSCH. As noted above, a scheduled TB may span multiple slots.

In one example of the third solution, a size of a priority indicator field in a DCI format supporting both multiple PUSCH scheduling and priority indication is determined as follows:

Priority indicator:
    0 bit if higher layer parameter PriorityIndicator-ForDCIFormat0_x (e.g., x=1, 2) is not configured;
    1 bit if higher layer parameter PriorityIndicator-ForDCIFormat0_x is configured and the number of scheduled PUSCH indicated by the Time domain resource assignment field is 1;
    2, 3, 4, 5, 7, 7 or 8 bits determined based on the maximum number of schedulable PUSCH among all entries in the higher layer parameter pusch-TimeDomainAllocationList-r16, e.g., as defined in clause 7.1.4 of 3GPP TS 38.214.

Here, the bits of the priority indicator field in the DCI format are one-to-one mapped to the scheduled PUSCH(s) with the corresponding transport block(s) in the scheduled order where the Least Significant Bit ("LSB") of the priority indicator field corresponds to the last scheduled PUSCH. For a bit of the priority indicator field, the bit value '1' indicates higher priority than the bit value '0'.

In another embodiment of the third Solution, a DCI format that schedules one or more PUSCHs carrying different transport blocks includes one priority indication that applies to one scheduled PUSCH. The remaining scheduled PUSCH(s) is considered to have a priority index '0' (i.e., lower priority).

In one implementation of the third Solution, the one scheduled PUSCH is the first scheduled PUSCH. In another implementation of the third Solution, the one scheduled PUSCH is the last scheduled PUSCH. In yet another implementation of the third Solution, a UE receives, via higher-layer signaling (e.g., RRC and/or MAC Control Element ("CE")), information of an order of a scheduled PUSCH which the priority indicator is applicable to. That is, the one scheduled PUSCH is determined based on the received information.

In one example, a size of a priority indicator field in a DCI format supporting both multiple PUSCH scheduling and priority indication is determined as follows:

Priority indicator:
    0 bit if higher layer parameter PriorityIndicator-ForDCIFormat0_x (e.g., x=1, 2) is not configured;
    1 bit if higher layer parameter PriorityIndicator-ForDCIFormat0_x is configured.

The bit of the priority indicator field in the DCI format indicates a priority index of the first (or last, or higher-layer indicated) scheduled PUSCH.

In yet another embodiment of the third Solution, a DCI format that schedules one or more PUSCHs carrying different transport blocks includes one priority indication that applies to all PUSCH(s) scheduled by the DCI format.

In one example, a size of a priority indicator field in a DCI format supporting both multiple PUSCH scheduling and priority indication is determined as follows:

Priority indicator:
    0 bit if higher layer parameter PriorityIndicator-ForDCIFormat0_x (e.g., x=1, 2) is not configured;
    1 bit if higher layer parameter PriorityIndicator-ForDCIFormat0_x is configured.

The bit of the priority indicator field in the DCI format indicates a priority index for all the scheduled PUSCH(s).

Regarding URLLC, in one embodiment a URLLC service does not support PUSCH repetition Type-B based on NR-U Rel-16 configured grant "CG" for shared (i.e., license-free) band operation. In another embodiment, the URLLC service supports enhancements of PUSCH repetition Type-B when using based on NR-U Rel-16 based CG for unlicensed band operation, such as those described above.

Regarding Coverage enhancement, multiple PUSCH transmission carry a single TB which is to be repeated, as described above. In certain embodiments, consecutive physical slots for UL transmission may be used for TB over Multi-Slots ("TBoMS") for unpaired spectrum. In one embodiment, non-consecutive physical slots may be used for UL transmission for TBoMS for unpaired spectrum. In certain embodiments, consecutive physical slots for UL transmission can be used for TBoMS for paired spectrum and the Supplementary Uplink ("SUL") band. In one embodiment, non-consecutive physical slots for UL transmission may also be used for paired spectrum and the SUL band.

In certain embodiments, non-consecutive physical slots for UL transmission can be used to transmit TBoMS at least for unpaired spectrum. In certain embodiments, non-consecutive physical slots for UL transmission may be used to transmit TBoMS for paired spectrum and supplementary uplink band as well.

Regarding the definition of a single TBoMS, in a first embodiment one transmission occasion for TBoMS ("TOT") is determined for a TBoMS. In this embodiment, the TB is transmitted on the TOT using a single Redundancy Version ("RV"). In one implementation, the single RV is rate matched using continuous rate-matching across the TOT. In another implementation, the single RV is rate matched for each slot in the TOT.

In a second embodiment, only one TOT is determined for a TBoMS. In this embodiment, the TB is transmitted on the TOT using different RVs. In one implementation, the RV index is refreshed within the TOT after each slot boundary. In another implementation, the RV index is refreshed within the TOT at every jump between two non-contiguous resources, if any.

In a third embodiment, multiple TOTs are determined for a TBoMS, where the TB is transmitted on the multiple TOTs using a single RV. In one implementation, the single RV is rate matched for each of the multiple TOTs. In one embodiment, the single RV is rate matched for all TOTs, e.g., using continuous rate-matching across the TOT. In another implementation, the single RV is rate matched for each slot in the multiple TOTs.

In a fourth embodiment, multiple TOTs are determined for a TBoMS, where the TB is transmitted on the multiple TOTs using different RVs. In one implementation, the RV index is refreshed within one TOT after each slot boundary. In another implementation, the RV index is refreshed within one TOT at every jump between two non-contiguous resources, if any.

In some embodiments, a single TBoMS can be repeated, as described above in Solution 1c.

In various embodiments, one or both of the following approaches may be considered as a starting point to decide how parameter NInfo for TBoMS is calculated. In the first approach (Approach 1), the starting point is based on all REs determined across the symbols or slots over which the TBoMS transmission is allocated. In the second approach (Approach 2), the starting point is based on the number of REs determined in the first L symbols over which the TBoMS transmission is allocated, scaled by $K \geq 1$. Here, L is the number of symbols determined using the SLIV of PUSCH indicated via TDRA.

In various embodiments, one or two of the following options will be considered to calculate parameter NohPRB for TBoMS. In the first option (Option 1), NohPRB is assumed to be the same for all the slots over which the TBoMS transmission is allocated and can be configured by xOverhead as in Rel-15/16. In the second option (Option 2), NohPRB is calculated depending on both xOverhead and the number of symbols or slots over which the TBoMS transmission is allocated.

In certain embodiments of the above, repetitions of TBoMS are supported, as described above in Solution 1c.

Figure 8:
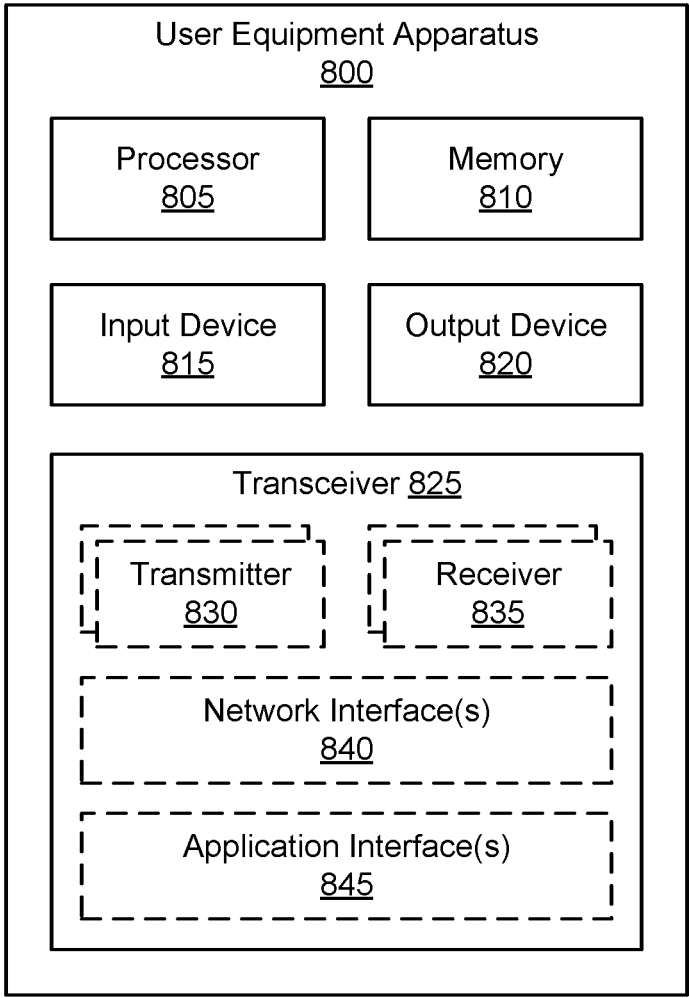
FIG. 8 is a diagram illustrating one embodiment of a user equipment apparatus that may be used for indicating a repetition scheme for a scheduled set of TBs.

FIG. 8 depicts a user equipment apparatus 800 that may be used for indicating a repetition scheme for a scheduled set of TBs, according to embodiments of the disclosure. In various embodiments, the user equipment apparatus 800 is used to implement one or more of the solutions described above. The user equipment apparatus 800 may be one embodiment of the remote unit 105 and/or the UE 205, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. In some embodiments, the transceiver 825 communicates with one or more cells (or wireless coverage areas) supported by one or more base units 121. In various embodiments, the transceiver 825 is operable on unlicensed spectrum. Moreover, the transceiver 825 may include multiple UE panels supporting one or more beams. Additionally, the transceiver 825 may support at least one network interface 840 and/or application interface 845. The application interface(s) 845 may support one or more APIs. The network interface(s) 840 may support 3GPP reference points, such as Uu, N1, PC5, etc. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. In certain embodiments, the processor 805 may include an application processor (also known as "main processor") which manages application-domain and operating system ("OS") functions and a baseband processor (also known as "baseband radio processor") which manages radio functions.

In various embodiments, via the transceiver 825, the processor 805 receives control signaling (e.g., DCI, CG, etc.) that contains scheduling information (i.e., a configuration and/or indication) for the transmission of a set of one or more TBs over a plurality of transmission occasions (e.g., slots) and receives repetition information (i.e., a configuration and/or indication) that schedules time-domain repetition of the set of TBs.

For each TB in the set of TBs, the processor 805 determines whether to apply the time-domain repetition based on the time-domain resources allocated for each TB (e.g., based on slot index, starting symbol and duration). Additionally, the processor 805 controls the transceiver 825 to transmit the set of TBs in accordance with the scheduling information and the repetition information.

In some embodiments, the set of TBs contains a single TB scheduled over the plurality of transmission occasions. In other embodiments, the set of TBs contains multiple TBs. In some embodiments, the repetition information is semi-statically configured using higher-layer signaling (e.g., RRC signaling and/or MAC CE), where the repetition information includes at least one repetition factor.

In some embodiments, transmitting the set of TBs in accordance with the scheduling information and the repetition information includes transmitting a first instance of each TB in the set of TBs prior to transmitting a second instance of (i.e., repetition of) any TB in the set of TBs. In other embodiments, transmitting the set of TBs in accordance with the scheduling information and the repetition information includes transmitting all repetitions of a first TB in the set of TBs prior to transmitting a second (i.e., next) TB in the set of TBs.

In some embodiments, the control signaling contains a Time-Domain Resource Allocation ("TDRA") table. In such embodiments, the scheduling information for the set of TBs may include multiple Start and Length Indicator Values ("SLIVs") in a row of the TDRA table, the multiple SLIVs corresponding to the set of TBs. In certain embodiments, the repetition information includes at least one repetition factor that is dynamically indicated within the row of the TDRA table.

In certain embodiments, the row of the TDRA table contains a mapping type for each SLIV. In one embodiment, an actual length of repetition must follow the length value indicated in a SLIV when the corresponding mapping type is a first type (i.e., repetition Type-A). In another embodiment, the actual length of repetition may differ from the indicated length value in the SLIV when the corresponding mapping type is a second type (i.e., repetition Type-B). As described above, FIG. 3 depicts one example of repetition Type-B mapping where the actual length of repetition differs from the length indicated in the SLIV. In contrast, FIG. 5 depicts one example of repetition Type-B where the actual length of repetition does not differ from the length indicated in the SLIV.

In some embodiments, the control signaling includes DCI, where the DCI further contains an NDI value for each TB in the set of TBs. In such embodiments, determining whether to apply the time-domain repetition is further based on the NDI corresponding to each TB, where no repetition of a particular TB is scheduled within the plurality of slots when the NDI of the particular TB indicates a retransmission. As used herein, the NDI of each TB may be a 1-bit indicator, where a toggled NDI for a HARQ process indicates that the transmission is an initial transmission of the corresponding TB, while a untoggled NDI for the HARQ process indicates that the transmission if a retransmission of a previously transmitted TB. A "toggled" NDI refers to a current NDI value (i.e., '0' or '1') being a different value than the previous NDI value. An "untoggled" NDI refers to the current NDI value being the same value as the previous NDI value.

In some embodiments, determining whether to apply the time-domain repetition is further based on a traffic priority level corresponding to each TB. In certain embodiments, no repetition of a particular TB is scheduled within the plurality of slots when the traffic priority level of the particular TB is below a threshold level. In some implementation, the priority level may be indicated using a priority value, where a lower priority value indicates a higher priority level, and a higher priority value indicates a lower priority level.

In some embodiments, a different repetition factor is associated with different traffic priority levels corresponding to the set of TBs. In certain embodiments, a first TB having a higher priority has a higher repetition factor than a second TB having a lower priority.

In some embodiments, the control signaling further includes a priority indication for each TB in the set of TBs. In such embodiments, determining whether to apply the time-domain repetition may be based on an indicated traffic priority level corresponding to each TB.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to indicating a repetition scheme for a scheduled set of TBs. For example, the memory 810 may store various parameters, panel/beam configurations, resource assignments, policies, and the like as described above. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
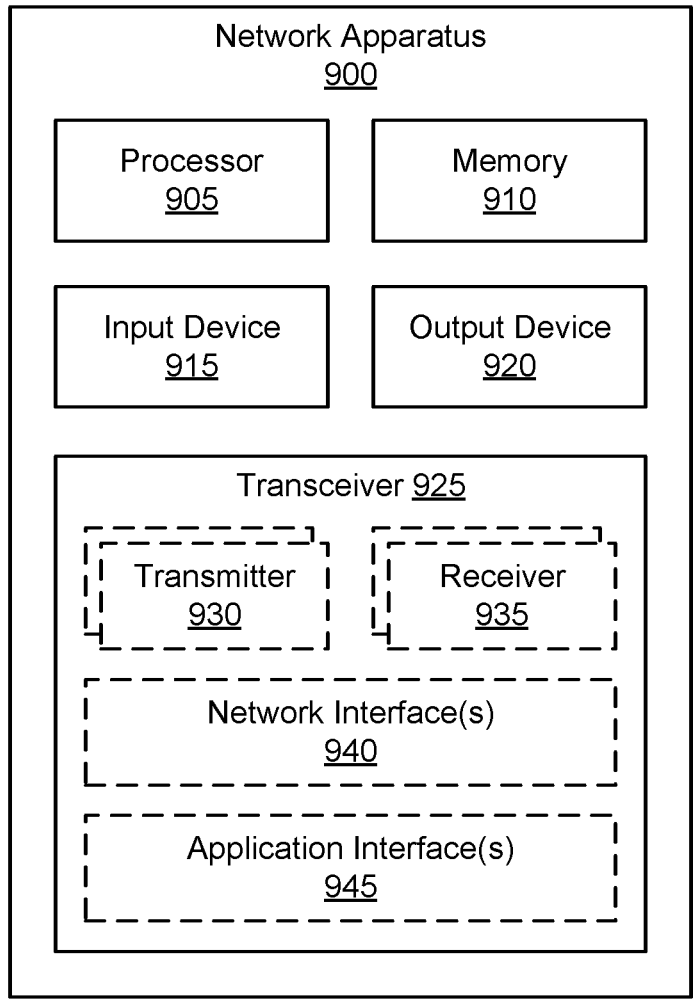
FIG. 9 is a diagram illustrating one embodiment of a network apparatus that may be used for indicating a repetition scheme for a scheduled set of TBs.

FIG. 9 depicts a network apparatus 900 that may be used for indicating a repetition scheme for a scheduled set of TBs, according to embodiments of the disclosure. In one embodiment, network apparatus 900 may be one implementation of a RAN node, such as the base unit 121, the RAN node 210, or a gNB, as described above. Furthermore, the base network apparatus 900 may include a processor 905, a memory 910, an input device 915, an output device 920, and a transceiver 925.

In some embodiments, the input device 915 and the output device 920 are combined into a single device, such as a touchscreen. In certain embodiments, the network apparatus 900 may not include any input device 915 and/or output device 920. In various embodiments, the network apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. Here, the transceiver 925 communicates with one or more remote units 95. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the network apparatus 900 is a RAN node (e.g., gNB) that communicates with one or more UEs, as described herein. In such embodiments, the processor 905 controls the network apparatus 900 to perform the above described RAN behaviors. When operating as a RAN node, the processor 905 may include an application processor (also known as "main processor") which manages application-domain and operating system ("OS") functions and a baseband processor (also known as "baseband radio processor") which manages radio functions.

In various embodiments, the processor 905 controls the network apparatus 900 to implement the above described RAN behaviors. For example, the processor 905 may determine scheduling information for the transmission of a set of one or more TBs over a plurality of transmission occasions (e.g., slots) and determine repetition information that schedules time-domain repetition of the set of TBs. Via the transceiver 925, the processor 905 transmits control signaling (e.g., DCI, CG, etc.) containing, e.g., configuration and/or indication of, the scheduling information and the repetition information and receives the set of TBs in accordance with the scheduling information and the repetition information, where the time-domain repetition is applied to the set of TBs based on time-domain resources allocated for each TB (e.g., based on slot index, starting symbol and duration).

In some embodiments, the set of TBs contains a single TB scheduled over the plurality of transmission occasions. In other embodiments, the set of TBs contains multiple TBs. In some embodiments, the repetition information is semi-statically configured using higher-layer signaling (e.g., RRC signaling and/or MAC CE), where the repetition information includes at least one repetition factor.

In some embodiments, receiving the set of TBs in accordance with the scheduling information and the repetition information includes receiving a first instance of each TB in the set of TBs prior to receiving a second instance of (i.e., repetition of) any TB in the set of TBs. In other embodiments, receiving the set of TBs in accordance with the scheduling information and the repetition information includes receiving all repetitions of a first TB in the set of TBs prior to receiving a second (i.e., next) TB in the set of TBs.

In some embodiments, the control signaling contains a Time-Domain Resource Allocation ("TDRA") table. In such embodiments, the scheduling information for the set of TBs may include multiple Start and Length Indicator Values ("SLIVs") in a row of the TDRA table, the multiple SLIVs corresponding to the set of TBs. In certain embodiments, the repetition information includes at least one repetition factor that is dynamically indicated within the row of the TDRA table.

In certain embodiments, the row of the TDRA table contains a mapping type for each SLIV. In one embodiment, an actual length of repetition must follow the length value indicated in a SLIV when the corresponding mapping type is a first type (i.e., repetition Type-A). In another embodiment, the actual length of repetition may differ from the indicated length value in the SLIV when the corresponding mapping type is a second type (i.e., repetition Type-B).

In some embodiments, the control signaling includes Downlink Control Information ("DCI"), where the DCI further contains a New Data Indicator ("NDI") value for each TB in the set of TBs. In such embodiments, the UE applies time-domain repetition to the set of TBs based on the NDI corresponding to each TB, where no repetition of a particular TB is scheduled within the plurality of slots when the NDI of the particular TB indicates a retransmission.

In some embodiments, the UE applies time-domain repetition to the set of TBs based on a traffic priority level corresponding to each TB. In certain embodiments, no repetition of a particular TB is scheduled within the plurality of slots when the traffic priority level of the particular TB is below a threshold level.

In some embodiments, a different repetition factor is associated with different traffic priority levels corresponding to the set of TBs. In certain embodiments, a first TB having a higher priority has a higher repetition factor than a second TB having a lower priority.

In some embodiments, the control signaling further includes a priority indication for each TB in the set of TBs. In certain embodiments, the UE applies time-domain repetition to the set of TBs based on an indicated traffic priority level corresponding to each TB.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to indicating a repetition scheme for a scheduled set of TBs.

For example, the memory 910 may store parameters, configurations, resource assignments, policies, and the like, as described above. In certain embodiments, the memory 910 also stores program code and related data, such as an operating system or other controller algorithms operating on the apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the network apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with network functions in the PLMN and/or RAN, as described herein. Although only one transmitter 930 and one receiver 935 are illustrated, the network apparatus 900 may have any suitable number of transmitters 930 and receivers 935. Further, the transmitter(s) 930 and the receiver(s) 935 may be any suitable type of transmitters and receivers.

Figure 10:
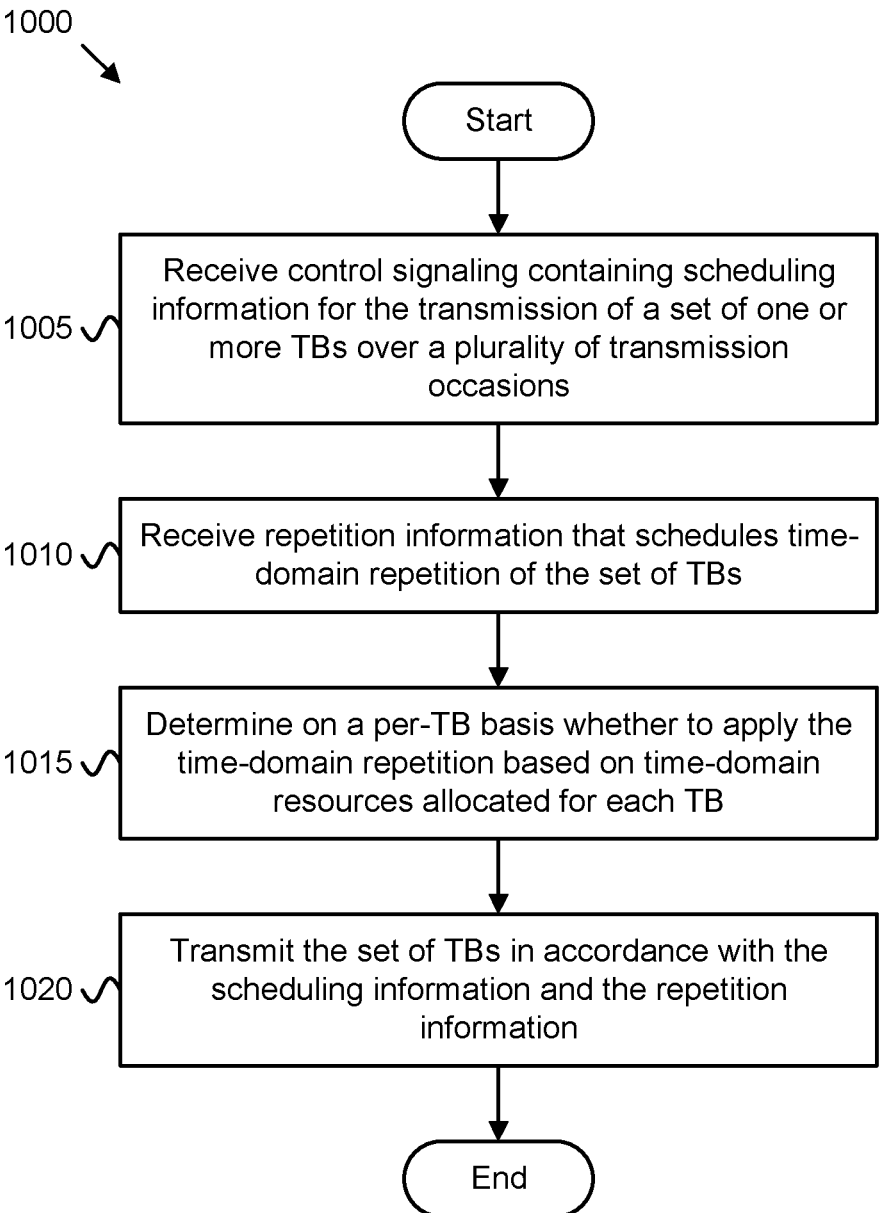
FIG. 10 is a flowchart diagram illustrating one embodiment of a first method for indicating a repetition scheme for a scheduled set of TBs.

FIG. 10 depicts one embodiment of a method 1000 for indicating a repetition scheme for a scheduled set of TBs, according to embodiments of the disclosure. In various embodiments, the method 1000 is performed by a user equipment device in a mobile communication network, such as the remote unit 105, the UE 205, and/or the user equipment apparatus 800, described above. In some embodiments, the method 1000 is performed by a processor, such as a microcontroller, a microprocessor, a CPU, a GPU, an auxiliary processing unit, a FPGA, or the like.

The method 1000 begins and receiving 1005 control signaling (e.g., DCI, Configured Grant, etc.) containing scheduling information for the transmission of a set of one or more TBs over a plurality of transmission occasions (e.g., slots). The method 1000 includes receiving 1010 repetition information that schedules time-domain repetition of the set of TBs. The method 1000 includes determining 1015 on a per-TB basis (i.e., for each TB in the set of TBs) whether to apply the time-domain repetition based on time-domain resources allocated for each TB. The method 1000 includes transmitting 1020 the set of TBs in accordance with the scheduling information and the repetition information. The method 1000 ends.

FIG. 11 depicts one embodiment of a method 1100 for indicating a repetition scheme for a scheduled set of TBs, according to embodiments of the disclosure. In various embodiments, the method 1100 is performed by a base station in a radio access network, such as the base unit 121, the RAN node 210, and/or the network apparatus 900, described above. In some embodiments, the method 1100 is performed by a processor, such as a microcontroller, a microprocessor, a CPU, a GPU, an auxiliary processing unit, a FPGA, or the like.

The method 1100 begins and determines 1105 scheduling information for the transmission of a set of one or more TBs over a plurality of transmission occasions (e.g., slots). The method 1100 includes determining 1110 repetition information that schedules time-domain repetition of the set of TBs. The method 1100 includes transmitting 1115 control signaling (e.g., DCI, Configured Grant, etc.) to a UE, the control signaling containing the scheduling information and the repetition information. The method 1100 includes receiving 1120 the set of TBs from the UE in accordance with scheduling information and the repetition information, where the time-domain repetition is applied to the set of TBs based on time-domain resources allocated for each TB. The method 1100 ends.

Disclosed herein is a first apparatus for indicating a repetition scheme for a scheduled set of TBs, according to embodiments of the disclosure. The first apparatus may be implemented by a user equipment device in a mobile communication network, such as the remote unit 105, the UE 205, and/or the user equipment apparatus 800, described above. The first apparatus includes a receiver that receives control signaling (e.g., DCI, CG, etc.) containing scheduling information (i.e., configuration and/or indication) for the transmission of a set of one or more TBs over a plurality of transmission occasions (e.g., slots) and receives repetition information (i.e., configuration and/or indication) that schedules time-domain repetition of the set of TBs. The first apparatus includes a processor that determines, for each TB in the set of TBs, whether to apply the time-domain repetition based on time-domain resources allocated for each TB (e.g., based on slot index, starting symbol and duration) and controls a transmitter to transmit the set of TBs in accordance with the scheduling information and the repetition information.

In some embodiments, the set of TBs contains a single TB scheduled over the plurality of transmission occasions. In other embodiments, the set of TBs contains multiple TBs. In some embodiments, the repetition information is semi-statically configured using higher-layer signaling (e.g., RRC signaling), where the repetition information includes at least one repetition factor.

In some embodiments, transmitting the set of TBs in accordance with the scheduling information and the repetition information includes transmitting a first instance of each TB in the set of TBs prior to transmitting a second instance of (i.e., repetition of) any TB in the set of TBs. In other embodiments, transmitting the set of TBs in accordance with the scheduling information and the repetition information includes transmitting all repetitions of a first TB in the set of TBs prior to transmitting a second (i.e., next) TB in the set of TBs.

In some embodiments, the control signaling contains a Time-Domain Resource Allocation ("TDRA") table. In such embodiments, the scheduling information for the set of TBs may include multiple Start and Length Indicator Values ("SLIVs") in a row of the TDRA table, the multiple SLIVs corresponding to the set of TBs. In certain embodiments, the repetition information includes at least one repetition factor that is dynamically indicated within the row of the TDRA table.

In certain embodiments, the row of the TDRA table contains a mapping type for each SLIV. In one embodiment, an actual length of repetition must follow the length value indicated in a SLIV when the corresponding mapping type is a first type (i.e., repetition Type-A). In another embodiment, the actual length of repetition is allowed to differ from the indicated length value in the SLIV when the corresponding mapping type is a second type (i.e., repetition Type-B).

In some embodiments, the control signaling includes Downlink Control Information ("DCI"), where the DCI further contains a New Data Indicator ("NDI") value for each TB in the set of TBs. In such embodiments, determining whether to apply the time-domain repetition is further based on the NDI corresponding to each TB, where no repetition of a particular TB is scheduled within the plurality of slots when the NDI of the particular TB indicates a retransmission.

In some embodiments, determining whether to apply the time-domain repetition is further based on a traffic priority level corresponding to each TB. In certain embodiments, no repetition of a particular TB is scheduled within the plurality of slots when the traffic priority level of the particular TB is below a threshold level.

In some embodiments, a different repetition factor is associated with different traffic priority levels corresponding to the set of TBs. In certain embodiments, a first TB having a higher priority has a higher repetition factor than a second TB having a lower priority.

In some embodiments, the control signaling further includes a priority indication for each TB in the set of TBs. In such embodiments, determining whether to apply the time-domain repetition may be based on an indicated traffic priority level corresponding to each TB.

Disclosed herein is a first method for indicating a repetition scheme for a scheduled set of TBs, according to embodiments of the disclosure. The first method may be performed by a user equipment device in a mobile communication network, such as the remote unit 105, the UE 205, and/or the user equipment apparatus 800, described above. The first method includes receiving control signaling (e.g., DCI, CG, etc.) containing scheduling information (e.g., configuration and/or indication) for the transmission of a set of one or more TBs over a plurality of transmission occasions (e.g., slots). The first method includes receiving repetition information (e.g., configuration and/or indication) that schedules time-domain repetition of the set of TBs and determining, for each TB in the set of TBs, whether to apply the time-domain repetition based on time-domain resources allocated for each TB (e.g., based on slot index, starting symbol and duration). The first method includes transmitting the set of TBs in accordance with the scheduling information and the repetition information.

In some embodiments, the set of TBs contains a single TB scheduled over the plurality of transmission occasions. In other embodiments, the set of TBs contains multiple TBs. In some embodiments, the repetition information is semi-statically configured using higher-layer signaling (e.g., RRC signaling), where the repetition information includes at least one repetition factor.

In some embodiments, transmitting the set of TBs in accordance with the scheduling information and the repetition information includes transmitting a first instance of each TB in the set of TBs prior to transmitting a second instance of (i.e., a repetition of) any TB in the set of TBs. In other embodiments, transmitting the set of TBs in accordance with the scheduling information and the repetition information includes transmitting all repetitions of a first TB in the set of TBs prior to transmitting a second (i.e., next) TB in the set of TBs.

In some embodiments, the control signaling contains a Time-Domain Resource Allocation ("TDRA") table. In such embodiments, the scheduling information for the set of TBs includes multiple Start and Length Indicator Values ("SLIVs") in a row of the TDRA table, the multiple SLIVs corresponding to the set of TBs. In certain embodiments, the repetition information includes at least one repetition factor that is dynamically indicated within the row of the TDRA table.

In certain embodiments, the row of the TDRA table contains a mapping type for each SLIV. In one embodiment, an actual length of repetition must follow the length value indicated in a SLIV when the corresponding mapping type is a first type (i.e., repetition Type-A). In another embodiment, the actual length of repetition is allowed to differ from the indicated length value in the SLIV when the corresponding mapping type is a second type (i.e., repetition Type-B).

In some embodiments, the control signaling includes Downlink Control Information ("DCI"), where the DCI further contains a New Data Indicator ("NDI") value for each TB in the set of TBs. In such embodiments, the determining whether to apply the time-domain repetition is further based on the NDI corresponding to each TB, where no repetition of a particular TB is scheduled within the plurality of slots when the NDI of the particular TB indicates a retransmission.

In some embodiments, determining whether to apply the time-domain repetition is further based on a traffic priority level corresponding to each TB. In certain embodiments, no repetition of a particular TB is scheduled within the plurality of slots when the traffic priority level of the particular TB is below a threshold level.

In some embodiments, a different repetition factor is associated with different traffic priority levels corresponding to the set of TBs. In certain embodiments, a first TB having a higher priority has a higher repetition factor than a second TB having a lower priority.

In some embodiments, the control signaling further includes a priority indication for each TB in the set of TBs. In certain embodiments, determining whether to apply the time-domain repetition is further based on an indicated traffic priority level corresponding to each TB.

Disclosed herein is a second apparatus for indicating a repetition scheme for a scheduled set of TBs, according to embodiments of the disclosure. The second apparatus may be implemented by a base station in a radio access network, such as the base unit 121, the gNB 210, and/or the network apparatus 900, described above. The second apparatus includes a processor that determines scheduling information for the transmission of a set of one or more TBs over a plurality of transmission occasions (e.g., slots) and determines repetition information that schedules time-domain repetition of the set of TBs. The second apparatus includes a transceiver that transmits control signaling (e.g., DCI, CG, etc.) containing, e.g., configuration and/or indication of, the scheduling information and the repetition information and receives the set of TBs in accordance with the scheduling information and the repetition information, where the time-domain repetition is applied to the set of TBs based on time-domain resources allocated for each TB (e.g., based on slot index, starting symbol and duration).

In some embodiments, the set of TBs contains a single TB scheduled over the plurality of transmission occasions. In other embodiments, the set of TBs contains multiple TBs. In some embodiments, the repetition information is semi-statically configured using higher-layer signaling (e.g., RRC signaling), where the repetition information includes at least one repetition factor.

In some embodiments, receiving the set of TBs in accordance with the scheduling information and the repetition information includes receiving a first instance of each TB in the set of TBs prior to receiving a second instance of (i.e., repetition of) any TB in the set of TBs. In other embodiments, receiving the set of TBs in accordance with the scheduling information and the repetition information includes receiving all repetitions of a first TB in the set of TBs prior to receiving a second (i.e., next) TB in the set of TBs.

In some embodiments, the control signaling contains a Time-Domain Resource Allocation ("TDRA") table. In such embodiments, the scheduling information for the set of TBs may include multiple Start and Length Indicator Values ("SLIVs") in a row of the TDRA table, the multiple SLIVs corresponding to the set of TBs. In certain embodiments, the repetition information includes at least one repetition factor that is dynamically indicated within the row of the TDRA table.

In certain embodiments, the row of the TDRA table contains a mapping type for each SLIV. In one embodiment, an actual length of repetition must follow the length value indicated in a SLIV when the corresponding mapping type is a first type (i.e., repetition Type-A). In another embodiment, the actual length of repetition is allowed to differ from the indicated length value in the SLIV when the corresponding mapping type is a second type (i.e., repetition Type-B).

In some embodiments, the control signaling includes Downlink Control Information ("DCI"), where the DCI further contains a New Data Indicator ("NDI") value for each TB in the set of TBs. In such embodiments, the UE applies time-domain repetition to the set of TBs based on the NDI corresponding to each TB, where no repetition of a particular TB is scheduled within the plurality of slots when the NDI of the particular TB indicates a retransmission.

In some embodiments, the UE applies time-domain repetition to the set of TBs based on a traffic priority level corresponding to each TB. In certain embodiments, no repetition of a particular TB is scheduled within the plurality of slots when the traffic priority level of the particular TB is below a threshold level.

In some embodiments, a different repetition factor is associated with different traffic priority levels corresponding to the set of TBs. In certain embodiments, a first TB having a higher priority has a higher repetition factor than a second TB having a lower priority.

In some embodiments, the control signaling further includes a priority indication for each TB in the set of TBs. In certain embodiments, the UE applies time-domain repetition to the set of TBs based on an indicated traffic priority level corresponding to each TB.

Disclosed herein is a second method for indicating a repetition scheme for a scheduled set of TBs, according to embodiments of the disclosure. The second method may be performed by a base station in a radio access network, such as the base unit 121, the gNB 210, and/or the network apparatus 900, described above. The second method includes determining scheduling information for the transmission of a set of one or more TBs over a plurality of transmission occasions (e.g., slots). The second method includes determining repetition information that schedules time-domain repetition of the set of TBs. The second method includes transmitting, to a UE, control signaling (e.g., DCI, CG, etc.) containing, e g, configuration and/or indication of, the scheduling information and the repetition information and receiving, from the UE, the set of TBs in accordance with the scheduling information and the repetition information, where the time-domain repetition is applied to the set of TBs based on time-domain resources allocated for each TB (e.g., based on slot index, starting symbol and duration).

In some embodiments, the set of TBs contains a single TB scheduled over the plurality of transmission occasions. In other embodiments, the set of TBs contains multiple TBs. In some embodiments, the repetition information is semi-statically configured using higher-layer signaling (e.g., RRC signaling), where the repetition information includes at least one repetition factor.

In some embodiments, receiving the set of TBs in accordance with the scheduling information and the repetition information includes receiving a first instance of each TB in the set of TBs prior to receiving a second instance of (i.e., repetition of) any TB in the set of TBs. In other embodiments, receiving the set of TBs in accordance with the scheduling information and the repetition information includes receiving all repetitions of a first TB in the set of TBs prior to receiving a second (i.e., next) TB in the set of TBs.

In some embodiments, the control signaling contains a Time-Domain Resource Allocation ("TDRA") table. In such embodiments, the scheduling information for the set of TBs may include multiple Start and Length Indicator Values ("SLIVs") in a row of the TDRA table, the multiple SLIVs corresponding to the set of TBs. In certain embodiments, the repetition information includes at least one repetition factor that is dynamically indicated within the row of the TDRA table.

In certain embodiments, the row of the TDRA table contains a mapping type for each SLIV, wherein an actual length of repetition must follow the length value indicated in a SLIV when the corresponding mapping type is a first type (i.e., repetition Type-A), and wherein the actual length of repetition is allowed to differ from the indicated length value in the SLIV when the corresponding mapping type is a second type (i.e., repetition Type-B).

In some embodiments, the control signaling includes Downlink Control Information ("DCI"), wherein the DCI further contains a New Data Indicator ("NDI") value for each TB in the set of TBs. In such embodiments, the UE applies time-domain repetition to the set of TBs based on the NDI corresponding to each TB, where no repetition of a particular TB is scheduled within the plurality of slots when the NDI of the particular TB indicates a retransmission.

In some embodiments, the UE applies time-domain repetition to the set of TBs based on a traffic priority level corresponding to each TB. In certain embodiments, no repetition of a particular TB is scheduled within the plurality of slots when the traffic priority level of the particular TB is below a threshold level.

In some embodiments, a different repetition factor is associated with different traffic priority levels corresponding to the set of TBs. In certain embodiments, a first TB having a higher priority has a higher repetition factor than a second TB having a lower priority.

In some embodiments, the control signaling further includes a priority indication for each TB in the set of TBs. In certain embodiments, the UE applies time-domain repetition to the set of TBs based on an indicated traffic priority level corresponding to each TB.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a User Equipment ("UE"), the method comprising:
   receiving control signaling containing scheduling information for transmission of a set of transport blocks ("TBs") over a plurality of transmission occasions, wherein the control signaling comprises a Time-Domain Resource Allocation ("TDRA") table and the scheduling information for the set of TBs comprises multiple Start and Length Indicator Values ("SLIVs") in a row of the TDRA table, the multiple SLIVs corresponding to the set of TBs;
   receiving repetition information that schedules time-domain repetition of the set of TBs, wherein the repetition information comprises a repetition factor that is dynamically indicated within the row of the TDRA table;
   determining, for each TB in the set of TBs, whether to apply the time-domain repetition based on time-domain resources allocated for each TB and further based on a traffic priority level corresponding to each TB; and
   transmitting the set of TBs in accordance with the scheduling information and the repetition information.

2. The method of claim 1, wherein the set of TBs comprises a single TB scheduled over the plurality of transmission occasions.

3. The method of claim 1, wherein the repetition information comprises a repetition factor that is semi-statically configured by higher-layer signaling.

4. The method of claim 1, wherein transmitting the set of TBs in accordance with the scheduling information and the repetition information comprises transmitting a first instance of each TB in the set of TBs prior to transmitting a second instance of any TB in the set of TBs.

5. The method of claim 1, wherein transmitting the set of TBs in accordance with the scheduling information and the repetition information comprises transmitting all repetitions of a first TB in the set of TBs prior to transmitting a second TB in the set of TBs.

6. The method of claim 1, wherein the row of the TDRA table comprises a mapping type for each SLIV, wherein an actual length of repetition follows a length value indicated in a SLIV when the corresponding mapping type is a first type, and wherein the actual length of repetition differs from the indicated length value in the SLIV when the corresponding mapping type is a second type.

7. The method of claim 1, wherein the control signaling comprises Downlink Control Information ("DCI"), wherein the DCI further comprises a New Data Indicator ("NDI") value for each TB in the set of TBs, wherein the determining whether to apply the time-domain repetition is further based on the NDI corresponding to each TB, wherein no repetition of a particular TB is scheduled within a plurality of slots when the NDI of the particular TB indicates a retransmission.

8. The method of claim 1, wherein determining whether to apply the time-domain repetition is further based on a traffic priority level corresponding to each TB, wherein no repetition of a particular TB is scheduled within a plurality of slots when the traffic priority level of the particular TB is below a threshold level.

9. The method of claim 1, wherein a different repetition factor is associated with different traffic priority levels corresponding to the set of TBs, wherein a first TB having a higher priority has a higher repetition factor than a second TB having a lower priority.

10. The method of claim 1, wherein the control signaling further comprises a priority indication for each TB in the set of TBs, wherein determining whether to apply the time-domain repetition is further based on an indicated traffic priority level corresponding to each TB.

11. A User Equipment ("UE") in a mobile for wireless communication comprising:
  a memory; and
  a processor coupled with the memory and configured to cause the UE to receive control signaling containing scheduling information for transmission of a set of transport blocks ("TBs") over a plurality of transmission occasions, wherein the control signaling comprises a Time-Domain Resource Allocation ("TDRA") table and the scheduling information for the set of TBs comprises multiple Start and Length Indicator Values ("SLIVs") in a row of the TDRA table, the multiple SLIVs corresponding to the set of TBs;
  receive repetition information that schedules time-domain repetition of the set of TBs, wherein the repetition information comprises a repetition factor that is dynamically indicated within the row of the TDRA table;
  determine, for each TB in the set of TBs, whether to apply the time-domain repetition based on time-domain resources allocated for each TB and further based on a traffic priority level corresponding to each TB; and
  transmit the set of TBs in accordance with the scheduling information and the repetition information.

12. A method performed by a base station, the method comprising:
  determining scheduling information for transmission of a set of transport blocks ("TBs) over a plurality of transmission occasions;
  determining repetition information that schedules time-domain repetition of the set of TBs, wherein the repetition information comprises a repetition factor that is dynamically indicated within the row of a Time-Domain Resource Allocation ("TDRA") table;
  transmitting control signaling to a User Equipment ("UE"), the control signaling containing the scheduling information and the repetition information, wherein the control signaling comprises the TDRA table and the scheduling information for the set of TBs comprises multiple Start and Length Indicator Values ("SLIVs") in a row of the TDRA table, the multiple SLIVs corresponding to the set of TBs; and
  receiving, from the UE, the set of TBs in accordance with the scheduling information and the repetition information, wherein the time-domain repetition is applied to the set of TBs based on time-domain resources allocated for each TB and further based on a traffic priority level corresponding to each TB.

13. The method of claim 12, wherein the set of TBs comprises a single TB scheduled over the plurality of transmission occasions.

14. The method of claim 12, wherein receiving the set of TBs in accordance with the scheduling information and the repetition information comprises receiving a first instance of each TB in the set of TBs prior to receiving a second instance of any TB in the set of TBs.

15. The method of claim 12, wherein receiving the set of TBs in accordance with the scheduling information and the repetition information comprises receiving all repetitions of a first TB in the set of TBs prior to receiving a second TB in the set of TBs.

16. The method of claim 12, wherein the control signaling comprises Downlink Control Information ("DCI"), wherein the DCI further comprises a New Data Indicator ("NDI") value for each TB in the set of TBs, wherein the UE applies time-domain repetition to the set of TBs based on the NDI corresponding to each TB, wherein no repetition of a particular TB is scheduled within a plurality of slots when the NDI of the particular TB indicates a retransmission.

17. The method of claim 12, wherein a different repetition factor is associated with different traffic priority levels corresponding to the set of TBs, wherein a first TB having a higher priority has a higher repetition factor than a second TB having a lower priority.

* * * * *